United States Patent
Shimada et al.

(10) Patent No.: US 12,168,525 B2
(45) Date of Patent: Dec. 17, 2024

(54) COMPOSITE-MATERIAL AIRCRAFT PART AND METHOD OF MANUFACTURING SAME

(71) Applicant: Kawasaki Jukogyo Kabushiki Kaisha, Kobe (JP)

(72) Inventors: Naoki Shimada, Kobe (JP); Yoshihiro Nakayama, Kobe (JP); Sayaka Ochi, Kobe (JP); Shouhei Kanazawa, Kobe (JP); Kenshirou Okumura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 502 days.

(21) Appl. No.: 17/337,416

(22) Filed: Jun. 3, 2021

(65) Prior Publication Data
US 2021/0284317 A1    Sep. 16, 2021

Related U.S. Application Data

(63) Continuation of application No. PCT/JP2019/046789, filed on Nov. 29, 2019.

(30) Foreign Application Priority Data

Dec. 3, 2018 (JP) .................................. 2018-226503

(51) Int. Cl.
*B64F 5/10* (2017.01)
*B29C 70/34* (2006.01)
(Continued)

(52) U.S. Cl.
CPC .............. *B64F 5/10* (2017.01); *B29C 70/342* (2013.01); *B64C 1/061* (2013.01); *B64C 1/064* (2013.01);
(Continued)

(58) Field of Classification Search
CPC ......... B29C 70/04; B29C 70/06; B29C 70/08; B29C 70/085; B29C 70/16; B29C 70/20;
(Continued)

(56) References Cited

U.S. PATENT DOCUMENTS

2012/0076973 A1*  3/2012  Guzman ................ B29C 70/30
                                                                       156/499
2014/0190625 A1    7/2014  Buttrick et al.
(Continued)

FOREIGN PATENT DOCUMENTS

EP          3196238 A1     7/2017
JP       2010-23449 A      2/2010
(Continued)

*Primary Examiner* — Zachary M Davis
(74) *Attorney, Agent, or Firm* — XSENSUS LLP

(57) ABSTRACT

A composite-material aircraft structure includes: a laminated structure formed by laminating composite-material layers; and a curved structure having a circumferential length difference in a longitudinal direction. The laminated structure is maintained in the entire part including the curved structure. In each of the composite-material layers, the reinforced fiber is constituted by a single continuous fiber not including a joint portion and includes a partial slit portion and a notch portion that is the slit portion in an open state.

8 Claims, 7 Drawing Sheets

(51) Int. Cl.
 *B64C 1/06* (2006.01)
 *B29K 307/04* (2006.01)
 *B29L 31/30* (2006.01)
 *B64C 1/00* (2006.01)

(52) U.S. Cl.
 CPC ... *B29K 2307/04* (2013.01); *B29L 2031/3082* (2013.01); *B64C 2001/0072* (2013.01)

(58) Field of Classification Search
 CPC ..... B29C 70/34; B29C 70/342; B29C 70/345; B29C 70/541; B29C 70/56
 See application file for complete search history.

(56) References Cited

U.S. PATENT DOCUMENTS

| | | |
|---|---|---|
| 2015/0321429 A1 | 11/2015 | Soula et al. |
| 2015/0336337 A1 | 11/2015 | Allman et al. |
| 2016/0297167 A1 | 10/2016 | Crawford, III |
| 2019/0077048 A1* | 3/2019 | Fujita ...................... B29C 70/20 |

FOREIGN PATENT DOCUMENTS

| | | | |
|---|---|---|---|
| JP | 2015-214151 A | 12/2015 | |
| JP | 2016-508900 A | 3/2016 | |
| WO | WO-2017159567 A1 * | 9/2017 | ............. B29B 11/16 |

\* cited by examiner

COMPOSITE-MATERIAL AIRCRAFT PART AND METHOD OF MANUFACTURING SAME

CROSS-REFERENCES TO RELATED APPLICATIONS

The present application claims priority to PCT/JP2019/046789 filed Nov. 29, 2019, and JP 2018-226503 filed Dec. 3, 2018, both of which are incorporated herein by reference.

TECHNICAL FIELD

The present disclosure relates to a composite-material aircraft part and a method of manufacturing the composite-material aircraft part, and particularly to a composite-material aircraft part suitable as a long part including a curved structure having a circumferential length difference.

BACKGROUND

In recent years, fiber-reinforced resin composite materials (hereinafter suitably abbreviated as "composite materials") are widely used in fields in which metal materials have been used. Among the composite materials, carbon-fiber reinforced plastic (CFRP) which is formed by using carbon fiber as reinforced fiber and impregnating the carbon fiber with matrix resin such as epoxy resin is smaller in weight and higher in strength than the metal material. Therefore, known as composite-material parts in the field of aircrafts are large structural parts, such as wings and bodies.

Typically, when manufacturing the composite-material parts in the field of aircrafts, a manufacturing method using autoclave molding is used. However, since a molding time of the autoclave molding is relatively long, the autoclave molding is generally unsuitable for mass production. Since the number of above-described large structural parts per aircraft is small, the autoclave molding can be used. On the other hand, when manufacturing the small parts the number of which per aircraft is larger, it may be difficult to efficiently manufacture the small parts by the autoclave molding.

Due to an increase in air transport business demand in recent years, the improvement of flight operation efficiency of aircrafts has been desired. Therefore, demand for medium aircrafts and small aircrafts, rather than large aircrafts, tends to be increasing. As the demand for the medium aircrafts and the small aircrafts increases, the number of aircrafts manufactured per month also increases, and therefore, the manufacturing efficiency needs to be further improved. Since the composite-material aircraft parts are smaller in weight and higher in strength as described above, the composite-material aircraft parts are especially suitable as parts for the medium aircrafts and the small aircrafts. However, it is thought that when not only large parts but also small parts are manufactured by the autoclave molding, it is difficult to realize adequate manufacturing efficiency.

For example, if the number of skins constituting the body of the aircraft is $10^1$ per aircraft, the number of beams as long parts is $10^2$ per aircraft, and each of the number of stringers as long parts and the number of frames as long parts is $10^3$ per aircraft, i.e., several thousand per aircraft. Moreover, several thousands of types of smaller parts exist, such as clips, having different shapes from each other, and the number of such smaller parts per aircraft is $10^4$ per aircraft, i.e., several tens of thousands per aircraft. As above, each of the number of long parts and the number of small parts such as clips is several thousand to several tens of thousands per aircraft. Therefore, it is thought that if such parts are formed by using the composite material and the autoclave molding, the manufacturing efficiency significantly deteriorates.

Therefore, techniques for efficiently manufacturing composite-material aircraft parts at low cost have been conventionally proposed. For example, PTL 1 discloses a method of simply manufacturing a part (long part) having a thin and long entire shape by using a composite material at low cost. According to this method, a composite-material part for an aircraft structure is manufactured by: subjecting a composite material to pultrusion to obtain a preshaped object in which resin is partially polymerized; preparing a reinforcing element in which resin is partially polymerized; adding the reinforcing element to the preshaped object; and completing the polymerization of the resin.

CITATION LIST

Patent Literature

PTL 1: Japanese Laid-Open Patent Application Publication No. 2015-214151

SUMMARY

A composite-material aircraft structure according to the present disclosure includes: a laminated structure formed by laminating a plurality of composite-material layers each constituted by at least a reinforced fiber and a resin composition; and a curved structure having a circumferential length difference in a longitudinal direction. The laminated structure is maintained in the entire part including the curved structure. The composite-material layers include at least a composite-material layer in which the reinforced fiber is constituted by a single continuous fiber not including a joint portion and includes a partial slit portion and a notch portion that is the slit portion in an open state.

A method of manufacturing a composite-material aircraft structure according to the present disclosure includes: forming a laminated body by laminating a plurality of composite-material layers each constituted by a reinforced fiber and a resin composition; and placing the laminated body at a forming die and subjecting the laminated body to heating-pressurizing forming. The composite-material layers include a composite-material layer constituted by a single reinforced fiber and a resin composition, the single reinforced fiber including a slit region but not including a joint portion, the slit region including a plurality of partial slit portions. The forming die is curved in the longitudinal direction and includes a placement surface on which the laminated body is placed. The laminated body is placed on the placement surface, is entirely stretched in an in-plane direction, and is subjected to heating-pressurizing forming.

The above object, other objects, features, and advantages of the present disclosure will be made clear by the following detailed explanation of preferred embodiments with reference to the attached drawings.

DESCRIPTION OF EMBODIMENTS

Hereinafter, an exemplary embodiment of the present disclosure will be described with reference to the drawings. In the following description and the drawings, the same reference signs are used for the same or corresponding components, and the repetition of the same explanation is avoided.

Composite-Material Aircraft Part

First, one example of a composite-material aircraft part according to the present disclosure will be specifically described with reference to FIGS. 1 and 2A to 2C.

The composite-material aircraft part (hereinafter suitably abbreviated as an "aircraft part") according to the present disclosure includes: a laminated structure formed by laminating composite-material layers each including at least a reinforced fiber and a resin composition; and a curved structure having a circumferential length difference in a longitudinal direction. The laminated structure is maintained in the entire part including the curved structure. The composite-material layer is a layer in which at least, the reinforced fiber is comprised of a single continuous fiber not including a joint portion and includes partial slit portions and notch portions that are the slit portions in an open state.

Figure 1:
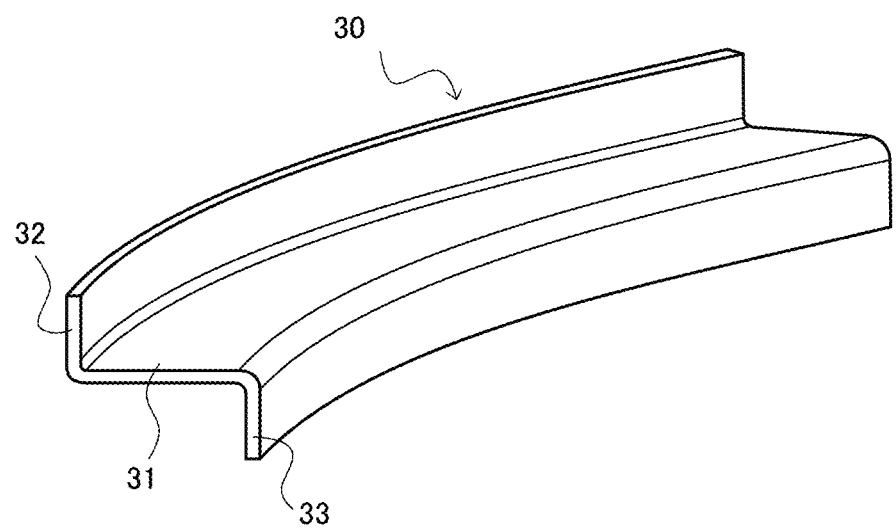
FIG. 1 is a schematic perspective view showing a typical configuration of a composite-material aircraft part according to an embodiment of the present disclosure.

An exemplary embodiment of the aircraft part according to the present disclosure is a Z-shaped frame 30 shown in FIG. 1. When viewed from an end surface of the Z-shaped frame 30, the Z-shaped frame 30 has such a shape as to include a plate-shaped main body portion 31 (or a web) and two flange portions 32 and 33 which are bent so as to extend from both respective edge portions of the main body portion 31 in directions away from each other.

Figure 2A:
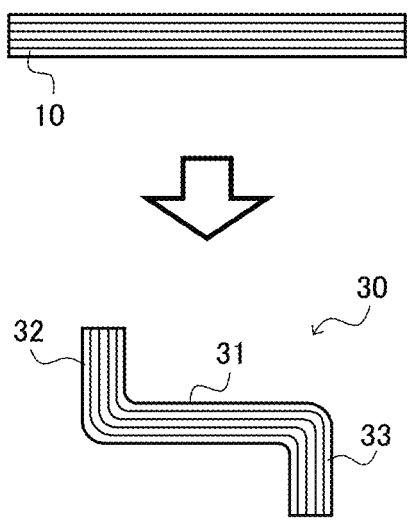
FIG. 2A is a diagram schematically showing a comparison among sections of examples of the composite-material aircraft part of FIG. 1 and a prepreg laminated body that is a material of the composite-material aircraft part.
Figure 2B:
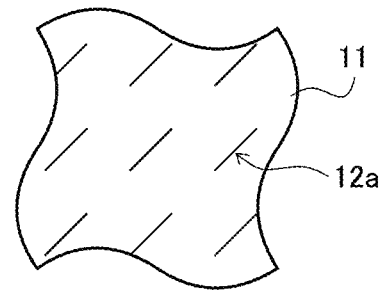
FIG. 2B is a partial plan view schematically showing one example of slit portions included in a reinforced fiber of the prepreg laminated body shown in FIG. 2A.
Figure 2C:
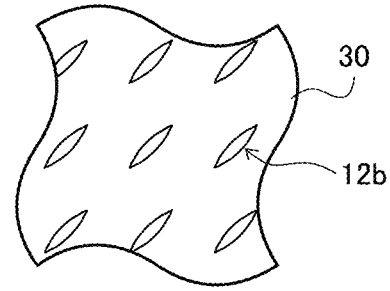
FIG. 2C is a partial plan view schematically showing one example of notch portions included in the reinforced fiber of the aircraft part shown in FIG. 2A.

FIG. 2A shows the Z-shaped frame 30 and a prepreg laminated body 10 that is a material of the Z-shaped frame 30. The prepreg laminated body 10 is shown at an upper side in FIG. 2A and has the laminated structure formed by laminating composite-material layers. A lower side in FIG. 2A shows a section of the Z-shaped frame 30. The laminated structure is maintained in all of the main body portion 31 and the flange portions 32 and 33. As described below, the aircraft part, such as the Z-shaped frame 30, is manufactured by subjecting the prepreg laminated body 10 to press forming. In the present disclosure, the prepreg laminated body 10 is constituted by laminating prepregs (semi-cured composite-material layers). Therefore, the aircraft part manufactured by using the prepreg laminated body 10 as the material of the aircraft part is a part in which cured composite-material layers are laminated (i.e., a part having the laminated structure).

The composite-material layer is including at least the reinforced fiber and the resin composition. In the present disclosure, the composite-material layers include at least a composite-material layer including a single reinforced fiber which includes a slit region containing partial slit portions but does not include the joint portion. Specifically, as schematically shown in, for example, FIG. 2B, a composite-material layer 11 (i.e., the prepreg) before curing includes a region (slit region) where partial slit portions 12a are formed. As described below, this slit region may be formed at part of the composite-material layer 11 or may be formed at the entire composite-material layer 11. It should be noted that the joint portion not included in the aircraft part according to the present disclosure will be described later.

All of the reinforced fibers of composite-material layers 11 comprising the prepreg laminated body 10 may include the slit regions, or some of the reinforced fibers may not include the slit regions. When the composite-material layer 11 in which the reinforced fiber includes the slit region is referred to as a "first composite-material layer" for convenience of explanation, the composite-material layer in which the reinforced fiber does not include the slit region may be referred to as a "second composite-material layer." In the present disclosure, each of the reinforced fiber comprising the first composite-material layer and the reinforced fiber comprising the second composite-material layer is a single reinforced fiber not including the joint portion, i.e., the single composite-material layer includes a reinforced fiber layer and does not include plural reinforced fiber layers.

As described above, the aircraft part, such as the Z-shaped frame 30, manufactured by subjecting the prepreg laminated body 10 to the press forming includes the curved structure having the circumferential length difference in the longitudinal direction. In the first composite-material layer (i.e., the composite-material layer in which the reinforced fiber includes the slit portions 12a) among the cured composite-material layers constituting the aircraft part, the reinforced fiber is stretched in the press forming, and with this, most of slit portions 12a open. The open states of the opened slit portions 12a are maintained by the curing of the resin composition. Therefore, as shown in, for example, FIG. 2C, notch portions 12b that are the opened slit portions 12a are formed on the manufactured aircraft part (Z-shaped frame 30).

In the present disclosure, specific types of the reinforced fiber and the resin composition comprising the composite-material layer are not especially limited, and materials applicable to the aircraft parts can be suitably selected and used. A specific type of the reinforced fiber is not especially limited as long as the reinforced fiber can realize satisfactory physical properties (such as strength) of the aircraft part. Examples of the reinforced fiber include carbon fiber, polyester fiber, PBO (polyparaphenylene benzobisoxazole) fiber, boron fiber, aramid fiber, glass fiber, silica fiber (quartz fiber), silicon carbide (SiC) fiber, and nylon fiber. These reinforced fibers may be used alone or in combination of two or more. Among these, carbon fiber is preferably used especially in the field of aircrafts. Moreover, the type of usage of the reinforced fiber is not especially limited, but the reinforced fiber is typically used as a base material comprised braid, woven fabric, knit fabric, nonwoven fabric, or the like.

The resin composition with which the reinforced fiber is impregnated is only preferred to contain a resin material which can be used as a matrix material (parent material) that supports a base material. Specific examples of the resin material include thermosetting resin and thermoplastic resin.

A specific type of the thermosetting resin is not especially limited. Typical examples of the thermosetting resin include epoxy resin, polyester resin, vinylester resin, phenol resin, cyanate ester resin, polyimide resin, and polyamide resin. These thermosetting resins may be used alone or in combination of plural types. Moreover, a more specific chemical structure of the thermosetting resin is not especially limited, and the thermosetting resin may be a polymer formed by polymerizing known various monomers or may be a copolymer formed by polymerizing a plurality of monomers. Moreover, an average molecular weight, structures of a main chain and a side chain, and the like are not especially limited.

A specific type of the thermoplastic resin is not especially limited. However, engineering plastic, such as polyphenylene sulfide (PPS), polyether ether ketone (PEEK), and polyether imide (PEI), are preferably used especially in the field of aircraft parts. A more specific chemical structure of the thermoplastic resin is not especially limited, and the thermoplastic resin may be a polymer formed by polymerizing known various monomers or may be a copolymer formed by polymerizing a plurality of monomers. Moreover, an average molecular weight, structures of a main chain and a side chain, and the like are not especially limited.

The matrix material of the composite material may be comprised only of the above described thermosetting resin or thermoplastic resin (i.e., the matrix material may be constituted by only a known resin material). However, the matrix material of the composite material may contain known curing agents, known curing accelerators, known reinforcing materials and fillers other than the fiber base material, and other known additives. A specific type, composition, and the like of the additives, such as the curing agents and the curing accelerators, are not especially limited, and the additive of a known type or composition may be suitably used.

To be specific, in the present disclosure, the matrix material may be a thermosetting resin composition containing the thermosetting resin and other components or may be a thermoplastic resin composition containing the thermoplastic resin and other components. Therefore, in the present disclosure, the composite material may be a "thermosetting" material comprised of the reinforced fiber and the thermosetting resin or of the reinforced fiber and the thermosetting resin composition or may be a "thermoplastic" material comprised of the reinforced fiber and the thermoplastic resin or of the reinforced fiber and the thermoplastic resin composition.

As described above, the prepreg laminated body 10 that is a material of the aircraft part is formed by laminating the prepregs that are the semi-cured composite-material layers. The prepregs are sheet bodies each formed such that the base material comprised of the reinforced fiber is impregnated with the thermosetting resin composition or the thermoplastic resin composition and is then semi-cured. A specific configuration of the prepreg is not especially limited. Moreover, a specific configuration of the prepreg laminated body 10 formed by laminating the prepregs is not especially limited. For example, the shape of the prepreg, the number of prepregs laminated, a direction in which the prepregs are laminated, and the like can be suitably set in accordance with the shape, usage, type, and the like of the aircraft part to be obtained.

Moreover, the shape of the prepreg laminated body 10 is not especially limited. A typical shape of the prepreg laminated body 10 is a flat plate shape shown in FIG. 2A. However, the shape of the prepreg laminated body 10 is not limited to the flat plate shape. The shape of the prepreg laminated body 10 may be a simple shape similar to the flat plate shape or may partially include a three-dimensional shape.

The prepreg laminated body 10 may include another material layer other than the prepregs, i.e., the composite-material layers. To be specific, the aircraft part according to the present disclosure may include another material other than the composite material. For example, a resin layer made of resin (or a resin composition) having stretchability may be laminated on the surface of the prepreg laminated body 10. The aircraft part including the surface on which the resin layer is formed can be manufactured by subjecting the prepreg laminated body 10 including the resin layer to the heating-pressurizing forming as described below. Examples of the resin layer on the surface of the aircraft part include: a layer which gives machinability (for example, which prevents burrs, fine splits, and the like from being generated during below-described hole formation); and a layer which improves the appearance of the aircraft part. However, the resin layer on the surface of the aircraft part is not especially limited.

Moreover, the prepreg laminated body 10 may include a metal mesh layer or metal foil as the above-described another material layer. Since the metal mesh layer and the metal foil have stretchability, each of the metal mesh layer and the metal foil can be suitably used as the above-described another material layer of the aircraft part according to the present disclosure. For example, a copper mesh layer may be laminated on the surface of the prepreg laminated body 10. The aircraft part including the surface on which the copper mesh is formed can be manufactured by subjecting the prepreg laminated body 10 including the copper mesh layer to the heating-pressurizing forming as described below. The copper mesh layer is used in the aircraft part for a lightning protection measure. However, specific types and usages of the metal mesh layer and the metal foil are not especially limited.

The aircraft part according to the present disclosure is only preferred to be a long member including the curved structure having the circumferential length difference in the longitudinal direction as described above, and a specific configuration of the aircraft part is not especially limited. For example, in the Z-shaped frame 30 shown in FIGS. 1 and 2A, the flange portions 32 and 33 are bent relative to the main body portion 31 toward respective sides opposite to each other. However, a C-shaped frame may be formed such that the flange portions 32 and 33 are bent in the same direction, or an L-shaped frame may be formed so as to include only one flange portion 32. Therefore, the aircraft part according to the present disclosure may be configured such that at least one of side edges thereof in the longitudinal direction is bent to form a flange portion. Or, the main body portion 31 does not have to be flat and may have a wave structure, a bent structure, or a concave-convex structure such as beads.

The aircraft part to which the present disclosure is suitably applied is the long member extending in one direction and is only preferred to include the curved structure having the circumferential length difference in the longitudinal direction. Therefore, the aircraft part may be a frame, such as the Z-shaped frame 30, the C-shaped frame, or the L-shaped frame, a stringer, or a long member other than the frame and the stringer. Moreover, the sectional shape of the aircraft part is not limited to the Z shape, the C shape, the L shape, or the like, and may be another shape, such as a hat shape (Ω shape).

The content rate of the reinforced fiber in the aircraft part according to the present disclosure is not especially limited and may be suitably set in accordance with various physical properties or conditions required for the aircraft part. In the present disclosure, the content rate of the reinforced fiber in the aircraft part can be defined by a fiber volume content rate $V_f$. The fiber volume content rate $V_f$ is known in the fields of carbon fiber reinforced plastic (CFRP) and the like and is an index indicating, as a volume ratio, the amount (content) of fiber contained in the entire composite material. A method of calculating the fiber volume content rate $V_f$ is performed based on JIS K7075 or ASTM D3171.

The fiber volume content rate $V_f$ of the aircraft part according to the present disclosure is only preferred to fall within a range of 50% to 70% and more preferably falls within a range of 55% to 65%. If the fiber volume content rate $V_f$ is too low, the satisfactory physical properties and the like of the aircraft part may not be realized. In contrast, if the fiber volume content rate $V_f$ is too high, the amount of resin composition that is the matrix material becomes too small, and therefore, the resin composition cannot satisfactorily support the reinforced fiber. In addition, even when the reinforced fiber includes the slit portions 12a, the amount of reinforced fiber becomes relatively too large, and therefore, the reinforced fiber may not satisfactorily flow or stretch during the press forming.

Figure 3:
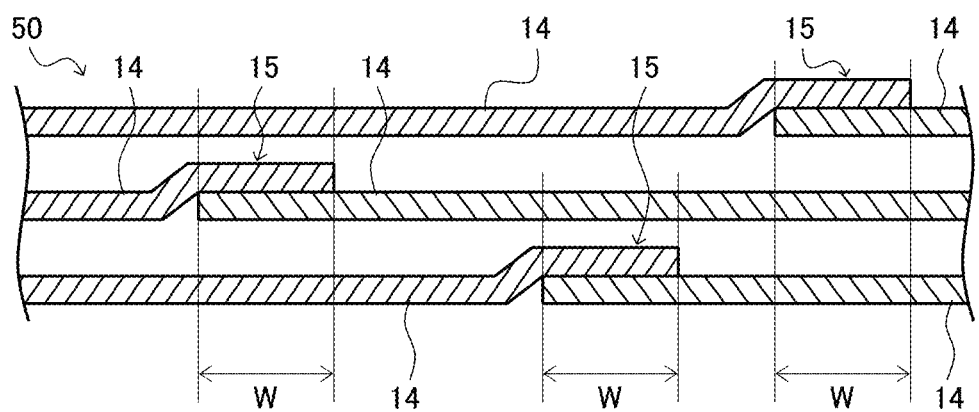
FIG. 3 is a schematic exploded sectional view showing one example of joint portions which are not included in the composite-material aircraft part according to the embodiment of the present disclosure but are included in conventional composite-material aircraft parts.

Hereinafter, the joint portion not included in the aircraft part according to the present disclosure will be specifically described with reference to FIG. 3. FIG. 3 schematically shows part of a conventional aircraft part 50. In the example shown in FIG. 3, part of the conventional aircraft part 50 has a flat plate configuration including three composite-material layers. However, the number of composite-material layers included in the actual aircraft part 50 is not limited to three and is only required to be two or more. Moreover, the shape of the actual aircraft part 50 is not limited to a flat plate shape, and the actual aircraft part 50 may include the above-described three-dimensional structure or another known structure.

In the aircraft part 50, one joint portion 15 is provided at reinforced fibers 14 comprising each composite-material layer. At the joint portion 15, one of the reinforced fibers 14 partially overlaps the other reinforced fiber 14. In the aircraft part, a width W of the joint portion 15 is, for example, 13 mm or more. Moreover, an interval between the joint portions 15 of the vertically adjacent composite-material layers is, for example, 25 mm or more. In the example shown in FIG. 3, the interval between the joint portion 15 of the reinforced fibers 14 of the lowermost composite-material layer (third layer) and the joint portion 15 of the reinforced fibers 14 of the intermediate composite-material layer (second layer) is only preferred to be 25 mm or more.

Conventionally, when the aircraft part includes the above-described three-dimensional structure, the prepreg laminated body 10 is first formed in a predetermined shape by, for example, manually laminating the prepregs and is then subjected to the heating-pressurizing forming in an autoclave. At this time, the prepregs are laminated such that as shown in FIG. 3, each layer includes the joint portion 15. If the prepreg laminated body 10 is formed by laminating the prepregs such that the joint portions 15 are not included, part of the aircraft part 50 obtained by the heating-pressurizing forming may not have adequate strength or adequate elastic modulus.

On the other hand, in the aircraft part according to the present disclosure, the reinforced fiber comprising the composite-material layer is comprised of a single continuous fiber and includes the partial slit portions. Therefore, in the heating-pressurizing forming, the reinforced fiber can flow and/or stretch together with the resin composition. As a result, the aircraft part including the three-dimensional structure that is at least one of the standing portion, the convex portion, or the curved portion can be manufactured without forming the joint portion 15 shown in FIG. 3.

Method of Manufacturing Composite-Material Aircraft Part

Next, a method of manufacturing the composite-material aircraft part according to the present disclosure will be specifically described with reference to FIGS. 4A, 4B, and 5.

Figure 4A:
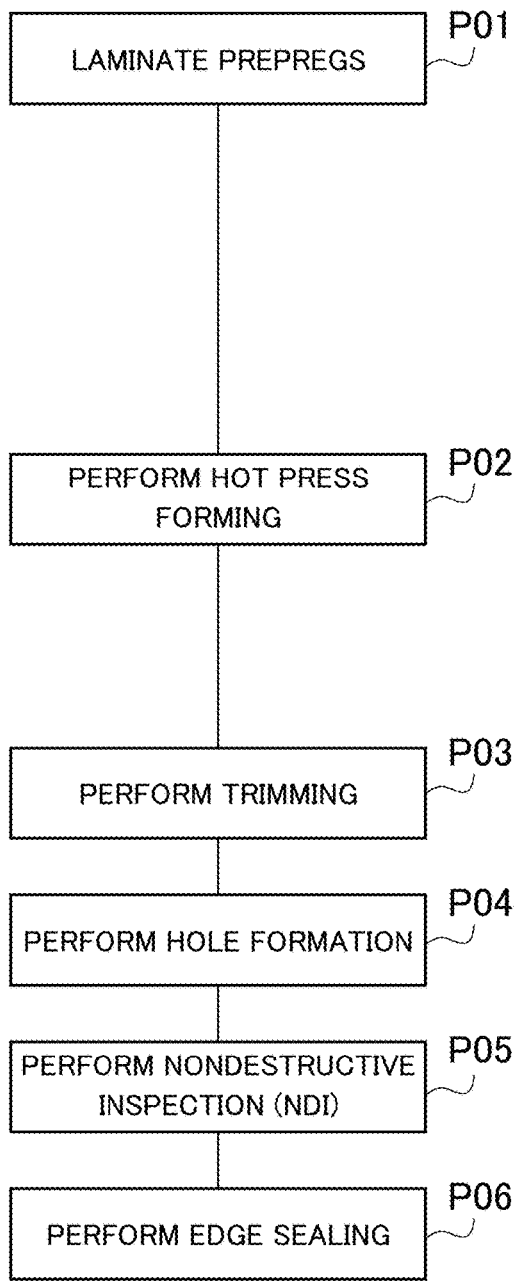
FIG. 4A is a process diagram showing a typical example of a method of manufacturing the composite-material aircraft part according to the embodiment of the present disclosure.
Figure 4B:
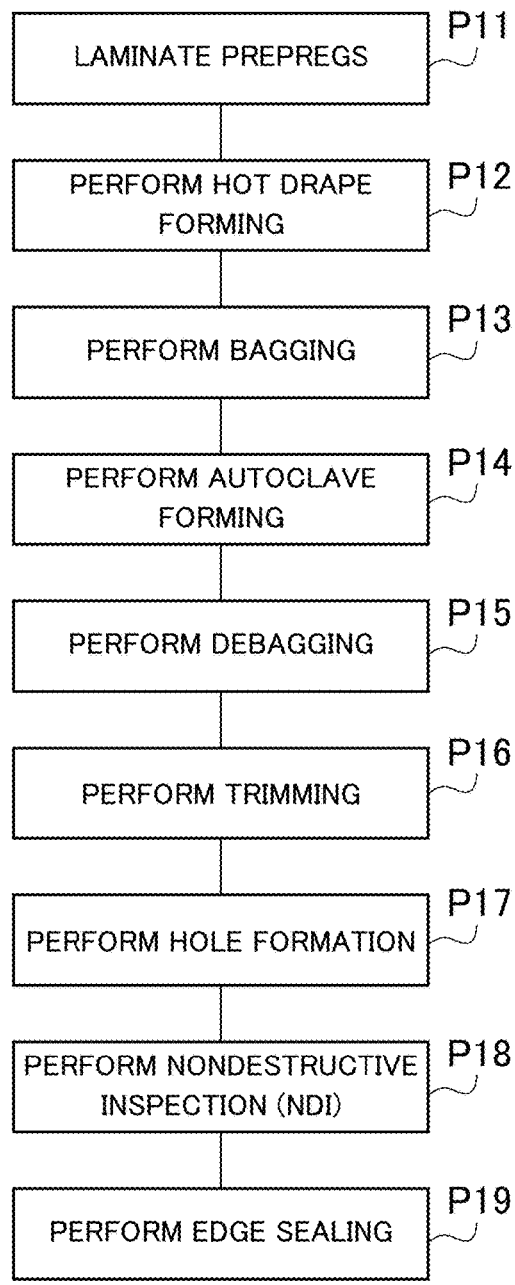
FIG. 4B is a process diagram showing a typical example of a method of manufacturing a conventional composite-material aircraft part.

A process diagram shown in FIG. 4A shows typical steps performed when manufacturing the aircraft part, such as the Z-shaped frame 30, shown in FIG. 1 or 2A. Moreover, a process diagram shown in FIG. 4B shows typical steps performed when manufacturing a conventionally general aircraft part. Although steps to be executed differ depending on conditions, such as the type of the composite material, the type and shape of the prepreg, and the type, shape, and usage of the aircraft part, each of the process diagrams shown in FIGS. 4A and 4B shows one example of a typical method of manufacturing a general aircraft part.

When manufacturing the aircraft part by a conventionally general manufacturing method, first, the prepreg laminated body 10 having a flat plate shape is prepared by laminating the prepregs (Step P11), and the curved structure is formed by subjecting the prepreg laminated body 10 to hot drape forming (Step P12). In the hot drape forming, the prepreg laminated body 10 is placed on a jig for forming the curved structure and the Z shape and heated and pressurized under such a condition that the resin composition is not cured but flows. With this, the prepreg laminated body 10 having the curved structure and the Z-shaped section is obtained. After that, by using a heat resistant film, a seal material, and the like, the prepreg laminated body 10 is subjected to bagging together with the male jig (Step P13) and is then subjected to autoclave molding (Step P14). Since the prepreg laminated body 10 is heated and pressurized by the autoclave molding, the prepreg laminated body 10 is cured while maintaining the curved structure and the Z-shaped section, and thus, the cured object, i.e., the aircraft part is obtained.

After the autoclave molding is terminated, the male jig and the aircraft part in the bagged state are subjected to debagging, and with this, the aircraft part is separated from the male jig (Step P15). In the autoclave molding, residuals generated since the resin composition flows out and is then cured are generated around the cured object. Therefore, to remove the residuals, the cured object is subjected to trimming (Step P16). After the trimming, the cured object is subjected to hole formation (Step P17). After that, the cured object is subjected to nondestructive inspection (NDI) (Step P18). In the NDI, the presence or absence of flaws, such as delamination, void, and porosity, which influence (or may influence) the quality of the cured object is inspected. After the NDI, the cured object is subjected to edge sealing (Step P19). By the edge sealing, moisture absorption from the fibers exposed at trim edges by the trimming can be prevented, and electrocorrosion through the exposed fibers can also be prevented.

On the other hand, in the method of manufacturing the aircraft part according to the present disclosure, the prepreg laminated body 10 is prepared by laminating the prepregs (Step P01) as with the conventional case, but the prepreg laminated body 10 is then subjected to hot press forming (heating-pressurizing forming) using a predetermined forming die (Step P02). As shown in FIG. 5, in the hot press forming, a Z-shaped frame jig 40 for forming the Z-shaped section and the curved structure is prepared.

The Z-shaped frame jig 40 is curved in the longitudinal direction and includes placement surfaces 40a and 40b having a circumferential length difference along the curve. The placement surface 40a is an upper surface of the Z-shaped frame jig 40. The placement surface 40b is a surface which is located adjacent to and stands at an outside edge of the placement surface 40a. A restricting portion 41 (shown by dotted lines in FIG. 5 for convenience sake) is provided at an inside edge of the placement surface 40a. For example, the restricting portion 41 is provided so as to be attachable to a restricting surface which is located adjacent to and stands at an inside of the placement surface 40a, and part of the prepreg laminated body 10 is restricted between the restricting portion 41 and the restricting surface.

Figure 5:
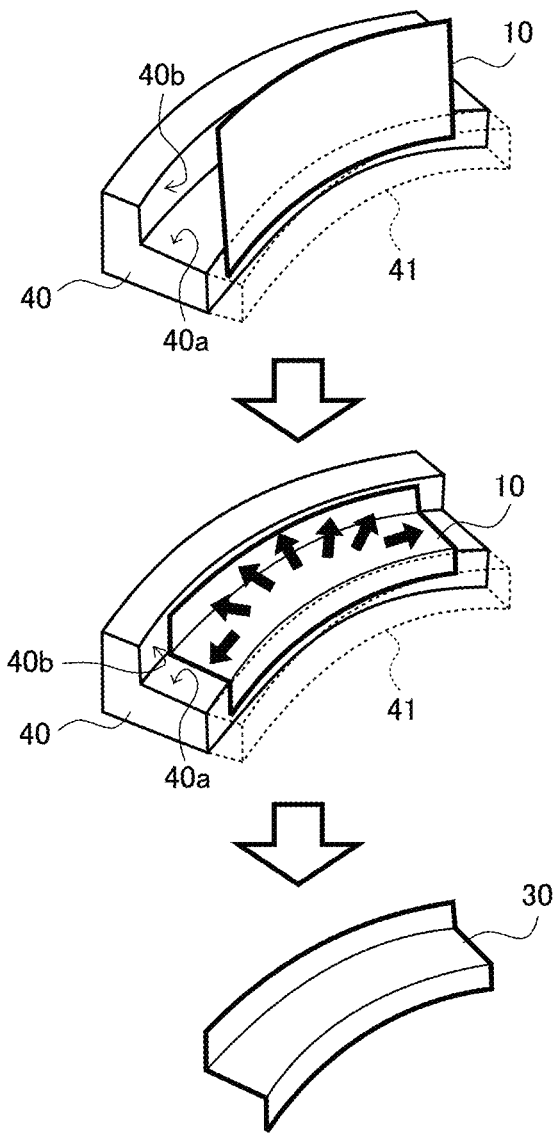
FIG. 5 is a schematic diagram showing an exemplary embodiment of a hot press forming step in the method of manufacturing the composite-material aircraft part shown in FIG. 4A.

As shown at an upper side in FIG. 5, first, one side edge portion of the prepreg laminated body 10 is restricted by the restricting portion 41. Then, as shown at a middle side in FIG. 5, the prepreg laminated body 10 is placed on the placement surfaces 40a and 40b while being extended on a large scale from the placement surface 40a toward the placement surface 40b (see black block arrows in FIG. 5) in an in-plane direction. By performing the hot press forming in this state, the resin composition flows on the Z-shaped frame jig 40, and the slit portions of the reinforced fiber open. With this, while practically maintaining the laminated structure of the reinforced fibers, the composite-material layers (i.e., the reinforced fibers and the resin compositions) including the reinforced fibers are stretched on a large scale, and the resin composition is cured. Thus, as shown at a lower side in FIG. 5, the aircraft part, such as the Z-shaped frame 30, including the curved structure having the circumferential length difference in the longitudinal direction can be easily formed by practically a single step that is the hot press forming.

Moreover, since the slit portions of the reinforced fiber open, and the composite-material layers are stretched on a large scale, an orientation angle of the reinforced fiber can be controlled to become a desired angle. For example, in the long part, such as the Z-shaped frame 30, including the curved structure, a fiber direction (orientation angle) of the reinforced fiber in each of a circumferential length direction and a direction orthogonal to the circumferential length direction may significantly contribute to the strength of the long part. In the present disclosure, since the reinforced fiber is stretched on a large scale by the slit portions, the fiber direction of the reinforced fiber can be controlled so as to extend substantially along the circumferential length direction and the direction orthogonal to the circumferential length direction. On the other hand, when the prepregs are laminated on each other by cutting and pasting as in conventional manufacturing methods, the fiber direction cannot be controlled so as to extend along the circumferential length direction and the direction orthogonal to the circumferential length direction.

Moreover, according to the manufacturing method of the present disclosure, the autoclave for performing heating and pressurizing in the conventional manufacturing method becomes unnecessary. Since the autoclave is more expensive than a facility for the hot press forming, the manufacturing method of the present disclosure can suppress an increase in cost for manufacturing facilities. When the autoclave is unnecessary, the bagging and the debagging are also unnecessary. The number of work steps and the work hours relatively increase by the bagging and the debagging. Therefore, by omitting the bagging and the debagging, the manufacturing method can be made more efficient. If the reinforced fiber of the prepreg laminated body 10 can be suitably stretched in the hot press forming (Step P02), it is unnecessary to restrict part of the prepreg laminated body 10 by the restricting portion 41 and the like.

After the cured object, i.e., the aircraft part is obtained by the hot press forming, the aircraft part is subjected to the trimming (Step P03) and the hole formation (Step P04) as described above. After that, the aircraft part is subjected to the NDI (Step P05), and the cured object is then subjected to the edge sealing (Step P06). According to the manufacturing method of the present disclosure, in the hot press forming (Step P02), the flowing of the composite material (the reinforced fibers and the resin compositions) comprising the prepreg laminated body 10 can be controlled. Therefore, the edge sealing can be omitted in accordance with the shape of the aircraft part, the type of the composite material, the conditions of the hot press forming, and the like.

Hereinafter, the control of the flowing and stretching of the composite material in the method of manufacturing the aircraft part according to the present disclosure will be described. As described above, in the present disclosure, the composite-material layers comprising the prepreg laminated body 10 include the first composite-material layer, i.e., the reinforced fiber includes the slit region (region where the slit portions 12a are formed). Therefore, in the hot press forming, not only the resin composition but also the reinforced fiber can be made to flow or stretch. The position of the slit region in the prepreg laminated body 10 is not especially limited, and a preferable position can be suitably set in accordance with the sectional structure of the aircraft part to be obtained or the degree of curve of the aircraft part to be obtained.

As above, according to the method of manufacturing the aircraft part of the present disclosure, the curved structure having the circumferential length difference in the longitudinal direction can be manufactured by the press forming by suitably setting the position of the slit region in the prepreg laminated body 10. Although it was conventionally possible to manufacture the aircraft long part having the circumferential length difference by subjecting the prepreg laminated body to the press forming, the circumferential length difference and the length of the long part were limited.

According to a conventional manufacturing method using the press forming, the limit of the length of the long member is about 300 mm in terms of manufacturing efficiency. Moreover, when a curvature radius R of the curved structure does not exceed 8,000 mm, the reinforced fiber is not stretched, and therefore, the prepreg laminated body does not fit a forming die, and wrinkles are generated especially at an inside of the prepreg laminated body. In contrast, according to the manufacturing method of the present disclosure, the long part having the length of 300 mm or more and the curvature radius R of 8,000 mm or less can be satisfactorily manufactured. Especially, the long part can be manufactured theoretically without the limit of the length.

Specific Examples of Aircraft Part

Figure 6:
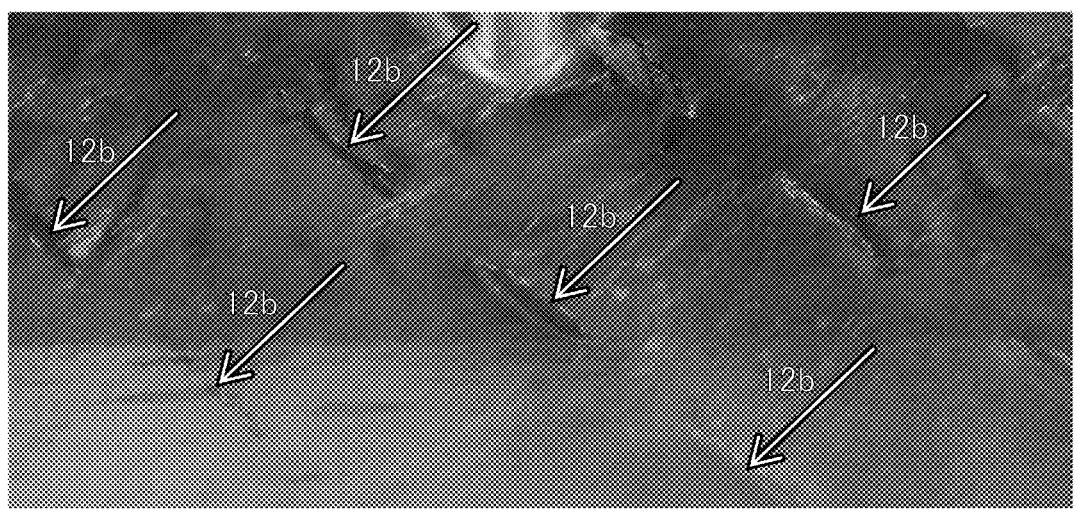
FIG. 6 is a diagram showing an exemplary embodiment of the notch portions shown in FIG. 2C.

Next, examples of the actually manufactured aircraft parts will be described with reference to FIGS. 6 and 7A to 7E. FIG. 6 is an actual example of the notch portion 12b schematically shown in FIG. 2C. Such notch portions are observed on the surface of the Z-shaped frame shown in FIG. 7A. In the example shown in FIG. 6, one example of the notch portions 12b formed on the surface of the aircraft part is shown, and this is a characteristic configuration of the aircraft part according to the present disclosure.

Figure 7A:
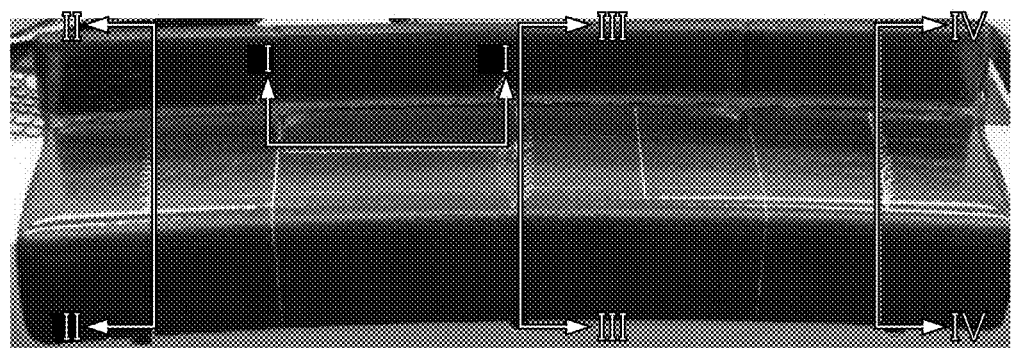
FIG. 7A is a diagram showing an exemplary embodiment of the composite-material aircraft part shown in FIG. 1.
Figure 7B:
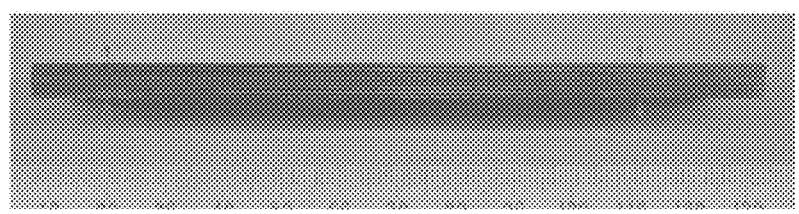
FIG. 7B is a diagram showing an exemplary embodiment of a section taken along line I-I in the composite-material aircraft part shown in FIG. 7A.
Figure 7C:
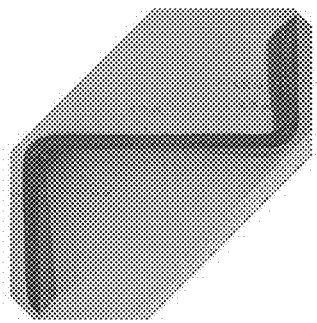
FIG. 7C is a diagram showing an exemplary embodiment of a section taken along line II-II in the composite-material aircraft part shown in FIG. 7A.
Figure 7D:
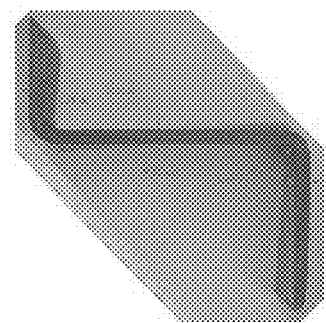
FIG. 7D is a diagram showing an exemplary embodiment of a section taken along line III-III in the composite-material aircraft part shown in FIG. 7A.
Figure 7E:
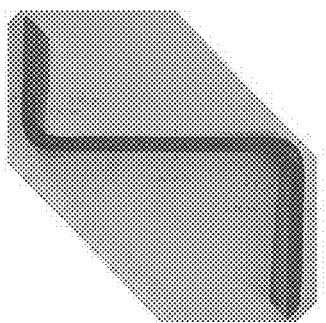
FIG. 7E is a diagram showing an exemplary embodiment of a section taken along line IV-IV in the composite-material aircraft part shown in FIG. 7A.

In the Z-shaped frame shown in FIG. 7A, the laminated structure is entirely and satisfactorily maintained. For example, as shown by a vertical section of the Z-shaped frame in FIG. 7B, i.e., as shown by a sectional view taken along line I-I of FIG. 7A, the laminated structure of the composite-material layers is satisfactorily maintained. Moreover, as shown by transverse sections of three portions of the Z-shaped frame, i.e., as shown by a sectional view taken along line II-II of FIG. 7A (shown in FIG. 7C), a sectional view taken along line of FIG. 7A (Shown in FIG. 7D), and a sectional view taken along line IV-IV of FIG. 7A (Shown in FIG. 7E), the laminated structure of the composite-material layers is entirely and satisfactorily maintained.

As above, the aircraft part according to the present disclosure includes: the laminated structure formed by laminating composite-material layers each including at least the reinforced fiber and the resin composition; and the curved structure having the circumferential length difference in the longitudinal direction. The laminated structure is maintained in the entire part including the curved structure. The composite-material layers include at least a composite-material layer in which the reinforced fiber is comprised of a single continuous fiber not including the joint portion and includes the partial slit portions and the notch portions that are the slit portions in an open state.

Moreover, in the method of manufacturing the aircraft part according to the present disclosure, when the laminated body is formed by laminating composite-material layers each including the reinforced fiber and the resin composition, and the laminated body is placed at the jig and subjected to the heating-pressurizing forming, the composite-material layers include the composite-material layer comprised of the resin composition and the single reinforced fiber which includes the slit region containing the slit portions but does not include the joint portion. The jig is curved in the longitudinal direction and includes the placement surface on which the laminated body is placed. The laminated body is placed on the placement surface, and part of the laminated body is restricted. Then, the entire laminated body is stretched in the in-plane direction and is subjected to the heating-pressurizing forming.

According to this configuration, the reinforced fiber is comprised of the single continuous fiber not including the joint portion and includes the partial slit portions. When the laminated body of the prepregs including such reinforced fibers is placed at the forming die and is subjected to the heating-pressurizing forming (press forming), the resin compositions flow in the cavity of the forming die, and the slit portions of the reinforced fibers open. With this, the composite-material layers (i.e., the reinforced fibers and the resin compositions) including the reinforced fibers are stretched on a large scale although the laminated structure of the reinforced fibers is practically maintained, or the laminated structure does not change significantly. Thus, the curved structure having the circumferential length difference in the longitudinal direction can be easily formed by practically a single step that is the heating-pressurizing forming. Therefore, the composite-material aircraft part can be easily manufactured by the press forming while stretching the laminated body in the in-plane direction as with metal without using the autoclave molding, and conventional labor of laminating the prepregs by cutting and pasting can be omitted. On this account, the manufacturing efficiency can be improved.

Composite-Material Aircraft Part According to Present Disclosure and Manufacturing Method Thereof A composite-material aircraft part according to the present disclosure includes: a laminated structure formed by laminating a plurality of composite-material layers each constituted by at least a reinforced fiber and a resin composition; and a curved structure having a circumferential length difference in a longitudinal direction. The laminated structure is maintained in the entire part including the curved structure. The composite-material layers include at least a composite-material layer in which the reinforced fiber is constituted by a single continuous fiber not including a joint portion and includes a partial slit portion and a notch portion that is the slit portion in an open state.

According to the above configuration, the reinforced fiber is constituted by the single continuous fiber not including the joint portion and includes the partial slit portion. When a laminated body of prepregs including such reinforced fibers is placed at a forming die and is subjected to heating-pressurizing forming (press forming), the resin compositions flow in the cavity of the forming die, and the slit portions of the reinforced fibers open. With this, the composite-material layers (i.e., the reinforced fibers and the resin compositions) including the reinforced fibers are stretched on a large scale although the laminated structure of the reinforced fibers is practically maintained, or the laminated structure does not change significantly. Thus, the curved structure having the circumferential length difference in the longitudinal direction can be easily formed by practically a single step that is the heating-pressurizing forming. Therefore, the composite-material aircraft part can be easily manufactured by the press forming while stretching the laminated body in an in-plane direction as with metal without using autoclave molding, and conventional labor of laminating the prepregs by cutting and pasting can be omitted. On this account, the manufacturing efficiency can be improved.

In the composite-material aircraft part having the above configuration, at least one of side edges of the composite-material aircraft part in the longitudinal direction may be bent.

In the composite-material aircraft part having the above configuration, a length of the composite-material aircraft part may be 300 mm or more, and a curvature radius R of the composite-material aircraft part may be 8,000 mm or less.

In the composite-material aircraft part having the above configuration, the resin composition may contain thermosetting resin or thermoplastic resin.

In the composite-material aircraft part having the above configuration, the reinforced fiber may be carbon fiber.

A method of manufacturing a composite-material aircraft part according to the present disclosure includes: forming a laminated body by laminating a plurality of composite-material layers each constituted by a reinforced fiber and a resin composition; and placing the laminated body at a forming die and subjecting the laminated body to heating-pressurizing forming. The composite-material layers include a composite-material layer constituted by a single reinforced fiber and a resin composition, the single reinforced fiber including a slit region but not including a joint portion, the slit region including a plurality of partial slit portions. The forming die is curved in a longitudinal direction and includes a placement surface on which the laminated body is placed. The laminated body is placed on the placement surface, is entirely stretched in an in-plane direction, and is subjected to heating-pressurizing forming.

In the method of manufacturing the composite-material aircraft part having the above configuration, when the composite-material layer including the slit region is referred to as a first composite-material layer, the composite-material layers may include a second composite-material layer constituted by a resin composition and a single reinforced fiber not including the slit region and the joint portion.

In the method of manufacturing the composite-material aircraft part having the above configuration, the slit region may be formed at part of the composite-material layer or the entire composite-material layer.

In the method of manufacturing the composite-material aircraft part having the above configuration, when stretching the laminated body in the in-plane direction, part of the laminated body may be restricted.

The present disclosure is not limited to the above-described embodiment and may be modified in various ways within the scope of the claims, and embodiments obtained by suitably combining technical means disclosed in different embodiments and/or plural modified examples are included in the technical scope of the present disclosure.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

The present disclosure can be widely and suitably used in the field of manufacturing composite-material aircraft parts, especially in the field of manufacturing, by composite materials, aircraft parts that are long members, such as frames and stringers, each including a curved structure having a circumferential length difference in a longitudinal direction.

Advantageous Effects of Invention

By the above configuration, the present disclosure has an effect of providing the composite-material aircraft part which has the curved structure and can be efficiently manufactured without using autoclave molding.

REFERENCE SIGNS LIST 10 prepreg laminated body
11 composite-material layer
12a slit portion
12b notch portion
14 reinforced fiber
15 joint portion
30 Z-shaped frame (aircraft part, long member)
31 main body portion
32, 33 flange portion
40 Z-shaped frame jig
40a, 40b placement surface
41 restricting portion

The invention claimed is:

1. A method of manufacturing a composite-material aircraft structure, the method comprising:
   forming a laminated body by laminating composite-material layers, wherein each composite-material layer includes a reinforced fiber and a resin composition;
   placing the laminated body at a forming die; and
   subjecting the laminated body to heating-pressurizing forming, wherein
   the composite-material layers include a composite-material layer that includes a single reinforced fiber and a resin composition, the single reinforced fiber including a slit region, the slit region including partial slits,
   the forming die is curved in a longitudinal direction and includes a placement surface on which the laminated body is placed,
   the heating-pressurizing forming includes:
      placing the laminated body on the placement surface; and
      stretching the laminated body in an in-plane direction while a part of the laminated body is restricted such that a side edge of the laminated body located at one side of the placement surface is restricted, and the laminated body is extended toward the other side of the placement surface in the in-plane direction,
   a plane of the laminated body in which the restriction is performed is orthogonal to the in-plane direction, and
   an entire portion of the laminated body is restricted in the plane.

2. The method according to claim 1, wherein when the composite-material layer including the slit region is referred to as a first composite-material layer, the composite-material layers include a second composite-material layer that include a resin composition and a single reinforced fiber not including the slit region and the joint portion.

3. The method according to claim 1, wherein the slit region is formed as a part of the composite-material layer or the entire composite-material layer.

4. The method according to claim 1, wherein the heating-pressurizing forming includes restricting the part of the laminated body by sandwiching the part of the laminated body between a side of the forming die and a restricting portion.

5. The method according to claim 4, wherein the part of the laminated body sandwiched between the side of the forming die and the restriction portion extends along a direction perpendicular to the placement surface.

6. The method according to claim 1, wherein the stretching includes bending the laminated body so that the part of the laminated body extends along a direction perpendicular to the placement surface and another part of the laminated body extends along the placement surface.

7. The method according to claim 6, wherein the stretching further includes bending another part of the laminated body, at an opposite end of the laminated body form the part of the laminated body, to extend along another surface of the forming die, the another surface extending along the direction perpendicular to the placement surface.

8. The method according to claim 1, wherein restriction of the laminated body includes sandwiching the side edge between a frame jig and a restricting portion.

* * * * *